United States Patent
Adair et al.

(10) Patent No.: US 6,374,776 B2
(45) Date of Patent: *Apr. 23, 2002

(54) ANIMAL RESTRAINING DEVICE

(76) Inventors: Janice Adair, P.O. Box 1181, Santa Barbara, CA (US) 93102; Dianne Hoskins Serka, 364 Ravenscroft Dr., Goleta, CA (US) 93107

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 48 days.

(21) Appl. No.: 09/460,286

(22) Filed: Dec. 9, 1999

(51) Int. Cl.[7] ............................................. A01K 27/00
(52) U.S. Cl. ..................................................... 119/771
(58) Field of Search ................................ 119/771, 792, 119/769, 712, 856

(56) References Cited

U.S. PATENT DOCUMENTS

| | | | | |
|---|---|---|---|---|
| 2,909,154 A | * | 10/1959 | Thomas | 119/771 |
| 3,563,208 A | * | 2/1971 | Nero | 119/771 |
| 4,252,084 A | * | 2/1981 | Willow | 119/771 |
| 4,676,198 A | * | 6/1987 | Murray | 119/771 |
| 4,791,886 A | * | 12/1988 | Anderson | 119/771 |
| 4,827,876 A | * | 5/1989 | Krekelberg | 119/771 |
| 4,834,027 A | * | 5/1989 | Meyer | 119/771 |
| 4,899,694 A | * | 2/1990 | Belluomini | 119/771 |
| 4,947,801 A | * | 8/1990 | Glass | 119/771 |
| 4,958,597 A | * | 9/1990 | Mildner | 119/771 |
| 4,970,991 A | | 11/1990 | Luce | 119/96 |
| D343,032 S | * | 1/1994 | Carrero | D30/151 |
| 5,305,710 A | * | 4/1994 | Ward, Jr. | 119/771 |
| 5,373,814 A | * | 12/1994 | Seymour | 119/771 |
| D360,711 S | * | 7/1995 | O'Neill | D30/151 |
| 5,551,379 A | * | 9/1996 | Hart | 119/771 |
| 5,598,812 A | * | 2/1997 | Graham et al. | 119/771 |
| 5,718,190 A | * | 2/1998 | Tinker | 119/771 |

* cited by examiner

Primary Examiner—Peter M. Poon
Assistant Examiner—Son T. Nguyen
(74) Attorney, Agent, or Firm—Michael G. Petit

(57) ABSTRACT

A multiple point tie-down tethering device and harness for restraining an animal within the limits of a predetermined boundary. The device is particularly adapted for safely transporting an animal, such as a dog, in a closed or open vehicle. In a preferred embodiment of the device, adapted for transporting up to two animals in the bed of a pickup truck, a centrally located, rectangular, animal attachment portion, fabricated preferably of webbing, has attachment rings on the four corners thereof. Four tethers, again preferably of webbing, extend outwardly from the four respective corners of the animal attachment portion, each tether having a first end which is attached to one of the four attachment rings, and a second end having means thereon for attaching the respective second ends to stationary objects such as U-bolts affixed preferably at or near opposing corners of the bed of the pickup truck. The animal attachment portion has one or more slidably mounted restraining clips thereon. A harness, adapted to fit securely on the animal, includes a "D" ring which is adapted to be releasably attached to one of the restraining clips. When an animal in harness is attached to the restraining clip via the "D" ring, the animal may move only within the confines of a boundary set by the size of the animal restraining portion upon which the clip slides. A second preferred embodiment of the device includes a single, linear dog attachment portion anchored by four tethers for restraining a single animal. The harness is adapted for attachment to a seat belt, a leash, or a restraining device in accordance with the present invention.

1 Claim, 2 Drawing Sheets

ANIMAL RESTRAINING DEVICE

BACKGROUND OF THE INVENTION

1. Field of the Invention

The invention discloses a harness and restraining device for transporting at least one animal in a vehicle.

2. Prior Art

Nearly everyone who has seen a dog riding unrestrained in the back of a pickup truck has experienced an uneasy feeling with regard to the animal's safety. The sight of a dog wearing a choke collar and restrained to the bed of a pickup truck by means of a leash, a rope or a similar tether is even more troubling. In order to provide means for more safely transporting dogs in a vehicle, a number of prior art devices have been disclosed.

Giroux, in U.S. Pat. No. 4,817,562 discloses a pet restraint comprising a harness adapted for attachment to a seat belt. A first connector portion of the harness has a male clip thereon adapted to receive and matingly engage the female fitting on the end of a seat belt. A second connector portion of the harness has a female fitting thereon adapted to receive and matingly engage the male fitting on the seat belt. The harness, with the animal attached thereto, becomes, in effect, a link between the left and right straps of the seat belt thereby restraining the animal.

Holt, Jr., in U.S. Pat. No. 5,915,335, discloses a harness for attachment to a dog which includes a loop through which a seat belt may be passed and securely fastened thereby anchoring the dog to the seat belt. Many other harnesses are disclosed in the prior art. Representative of such harnesses are U.S. Pat. Nos. 4,970,991; 5,893,339; 5,492,084 and 4,060,056. None of the above prior art devices is suitable for safely restraining a dog in the bed of a pickup truck.

Luce, in U.S. Pat. No. 4,970,991, discloses an animal restraining device which may be used for safely restraining a single dog in the bed of a pickup truck. The device consists of a harness having an attachment loop thereon and either one or two straps which may be passed through the loop. When the ends of the strap(s) are attached to opposing sides of the bed of the truck, the dog is restrained therein. The strap(s) are adjustable in length to adapt to both full sized and compact truck beds. In the device having a single strap, the animal is permitted considerable movement but may, in the extreme extent of range, project a portion of its body, namely its head, over the side of the truck and thereby be exposed to possible traumatic injury. When two straps are used, the animal has a extremely restricted range of motion which may lead to discomfort.

Thus, while prior art attempts to provide safe, humane restraints for pets traveling in a vehicle have met with limited success, there remains a need for a restraint which provides a generous range of motion for the animal while protecting the animal from traumatic and/or self injury while riding in a truck bed.

SUMMARY OF THE INVENTION

It is a primary object of the invention to provide a device operable for restraining a animal in a vehicle.

It is another object of the invention to provide a dog harness which is adapted to be attached to a seat belt, a leash and/or a four-point tie-down animal restraining device.

It is yet another object of the invention to provide a four-point restraining device adapted to be mounted within a truck bed or similar conveyance.

It is still another object of the invention to provide a harness which is adapted to be releasably attached to both a seat belt and a four-point tie-down restraining device.

It is yet a further object of the invention to provide a four-point restraining device which is adapted to restrain two animals within the bed of a truck.

While providing a harness and a four-point restraining device meeting the above-stated objectives is the principle purpose of the present invention, it is an overall objective of the present invention to provide a means for safely restraining an animal either inside a vehicle or in the bed of a truck. The harness, which will be described below, may be used with a leash, a seat belt and a four-point tie-down animal restraining device as described herein, while providing the animal with a range of motion consistent with safety and comfort.

The features of the invention believed to be novel are set forth with particularity in the appended claims. However the invention itself, both as to organization and method of operation, together with further objects and advantages thereof may best be understood by reference to the following description taken in conjunction with the accompanying drawings in which:

DESCRIPTION OF THE PREFERRED EMBODIMENTS

Figure 1:
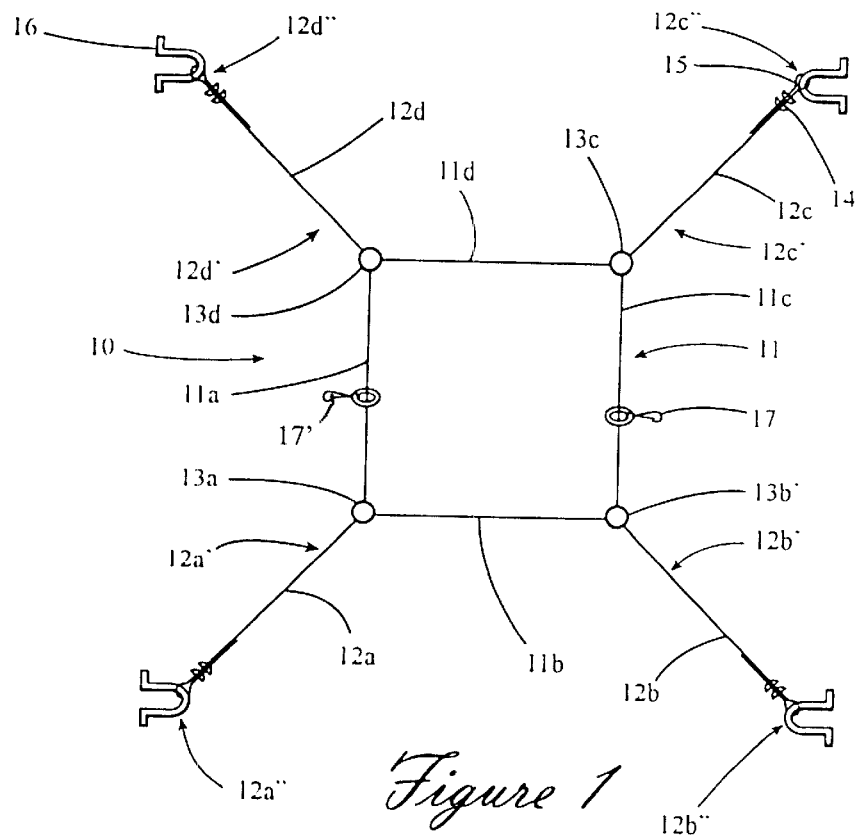
FIG. 1 is a top plan view of a four-point restraining device in accordance with the present invention which is adapted for transporting two animals in the bed of a truck.

Turning now to FIG. 1, a four-point restraining device adapted for tethering two dogs in the bed of a truck is shown in top plan view at numeral 10. The restraining device 10 has a square or preferably rectangular central attachment portion 11 having four orthogonal sides 11a–d and a tether portion comprising four tethers 12a–d. Each tether 12a–d has a medial end 12a'–d' which is affixed to one of the four connecting rings 13a–d, which rings form the respective corners of the central attachment portion 11, and a distal end 12a"–d" in opposition thereto. Length adjustment means 14 such as, for example, double D-rings, affixed to the tether near the distal end thereof, enable the length of the respective tethers to be adjusted. The respective distal ends 12a"–d" of the four tethers 12a–d include attachment means such as a loop or clip 15 which is operable for connecting the distal end of each tether to one of the four stationary anchoring fixtures 16 which, in turn, are affixed to the truck (truck not shown in FIG. 1). Two animal attachment clips 17 and 17' are slidably attached to opposing sides 11a and 11c of the central attachment portion 11. When the harnesses of two harnessed animals are attached to respective animal attachment clips 17 and 17', the animals are free to move over a range determined by the lengths of the cords or webbing forming the sides 11a and 11c and substantially centered in the bed of a truck.

Figure 2:
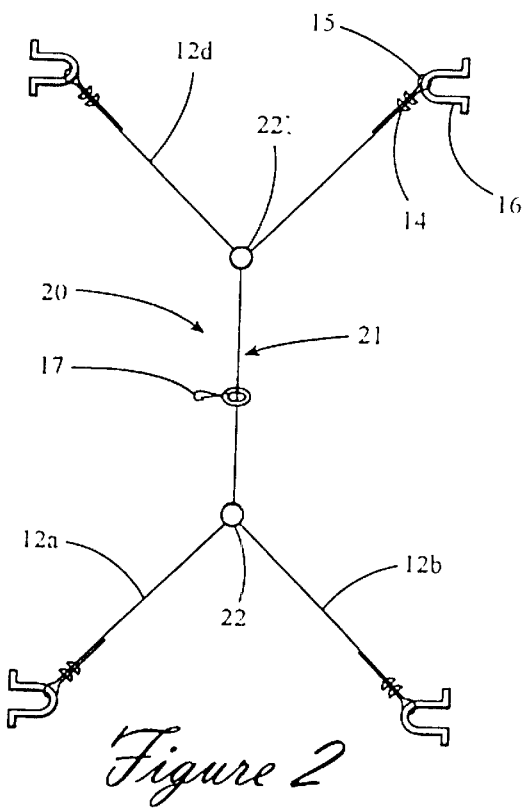
FIG. 2 is a top plan view of a second embodiment of the four-point restraining device similar to FIG. 1 but adapted to transport a single animal.

A top plan view of an embodiment of the present invention adapted for safely transporting a single animal is illustrated in FIG. 2. The four-point tie down restraining device 20 comprises an animal attachment portion 21 and four tethers 12a–d. The animal attachment portion 21 is a single length of cord or webbing linking tethers 12a and 12b together with tethers 12c and 12d through connecting rings 22 and 22'. As is the case with the two animal restraining device described in FIG. 1, each of the tethers 12a–d has length adjustment means 14 thereon operable for adjusting the length thereof. The linear animal attachment portion 21 has a animal harness attachment clip 17 slidably attached thereto which slides freely along the animal attachment portion 21 between connecting rings 22 and 22'. When the harness of a harnessed animal is attached to the animal attachment clip 17, the animal may move within a permissible range substantially centered within the truck bed, the size of the range being determined by the length of the cord or webbing comprising the animal attachment portion 21.

Figure 3:
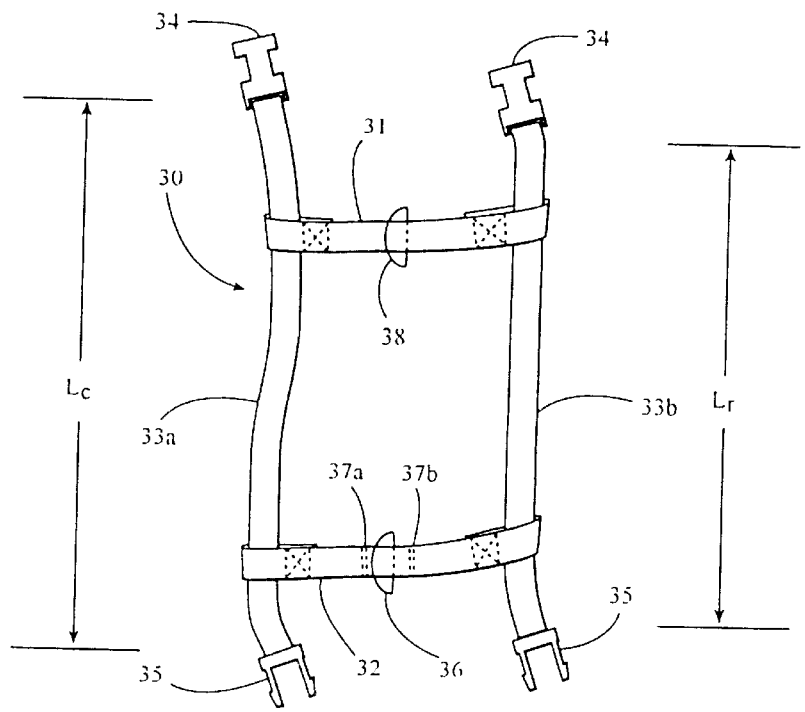
FIG. 3 is a top plan view of an animal harness in accordance with the present invention illustrating features of the harness which permit its use with a four-point restraining device as shown in FIGS. 1 and 2, a leash, or a conventional automobile seat belt.
Figure 4:
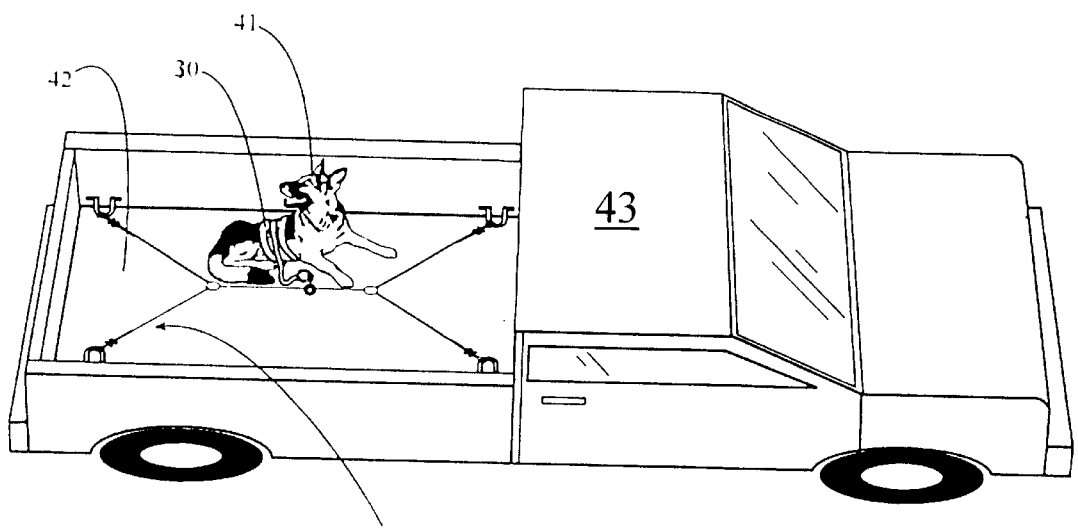
FIG. 4 is a perspective view illustrating a single dog in harness slidably attached to a four-point restraining device in the bed of a truck.

The four-point tie down animal restraining devices described in FIGS. 1 and 2 are intended to be used to restrain an animal in harness; the harness being releasably attachable to the animal restraining portion of the devices by means of the attachment clip(s) 17. A top plan view illustrating a suitable harness in accordance with the present invention adapted for use with either restraining device 10 or 20 is shown in FIG. 3. The harness 30 includes a back strap 31, a belly strap 32 substantially parallel to the back strap 31, the back strap and the belly strap being connected to one another by means of two parallel cinch straps; a chest cinch strap 33a and a rear cinch strap 33b. The cinch straps 33a and 33b each have a female connector 34 on one end thereof and a male connector 35 on the opposing end thereof and respective cinch lengths Lc and Lr therebetween wherein Lc is greater than Lr. In operation, the harness is attached to the animal to be transported by placing the back strap 31 on the animals back oriented in a direction parallel to the animal's backbone. With the back strap resting on the animal's back, one end of the chest cinch strap 33a and one end of the rear cinch strap 33b are passed underneath the animal and connected to the mating connector on the opposing end thereof so that the chest cinch strap 33a encircles the animals chest and the rear cinch strap 33b encircles the animal's rear quarter with the back strap 31 remaining over the back of the animal. The belly strap 32 will be positioned under the ventral surface of the animal extending from the chest to the belly thereof. A D-ring 36 attached to the belly strap 32 provides a means for securely attaching the harness 30 to the attachment clip 17 on the four-point tie down restraining device 10 or 20 described above. A second D-ring 38 attached to the back strap 31 provides a convenient attachment point for a leash (not shown) for use when the animal is released from the four-point restraining device. In addition, the second D-ring 38 is dimensioned to accommodate the passage of a male fastener on a seat belt therethrough.

Returning to FIG. 1, preferable dimensions for the opposing sides 11a and 11c of the animal restraining portion is about 26 inches while the length of the other two sides 11b and 11d is about 15 inches. The tethers 12a–d are adjustable in length but are preferably about 54 inches long, the optimal length being determined by the length and width of the truck bed. As with the four-point restraining device of FIG. 1, the length of the tethers in the single animal restraining device 20 is adjustable and preferably about 54 inches with the animal attachment portion 21 being about 26 inches long. A slightly perspective, overhead view illustrating a dog 41 wearing a harness 30 attached to a four-point restraining device 20 installed in the bed 42 of a pickup truck 43.

With reference now to FIG. 3, the dimensions of the elements comprising the harness 30 will depend upon the size of the animal to be harnessed. A harness dimensioned to snugly fit a small dog, for example, will preferably have the approximate dimensions: Lc=30 inches, Lr=25 inches, back strap=4 inches (the length of the back strap between the chest and rear cinch straps), with the belly strap measuring about 10 inches between the chest and rear cinch straps. For a large dog, for example, the respective measurements are preferably about: Lc=45 inches, Lr=39 inches, the back strap=5 inches and the belly strap measuring about 13 inches. The straps comprising the harness are preferably 2 inch wide webbing having tensile strength specifications similar to seat belt material.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What we claim is:

1. An animal restraining device adapted for installation in a vehicle having an open rectangular bed, the bed comprising a horizontal rectangular platform having four platform corners, the device being operable for confining the range of movement of an animal being transported in the open bed, the restraining device consisting of:

(a) an animal attachment portion having slidable animal attachment means thereon operable for releasably connecting an animal harness thereto, said animal attachment portion being rectangular in shape, said rectangular shape being defined by four sides, and four attachment portion corners, each of said four attachment portion corners being disposed at the intersection between adjacent sides;

(b) a tethering portion operable for anchoring said animal attachment portion to the bed of the truck; and (c) A harness for releasable attachment to an animal, said harness comprising: (a) a back strap having a forward end and a rearward end; (b) a belly strap having a forward end and a rearward end, said belly strap being oriented in a direction substantially parallel to said back strap; (c) a chest cinch strap affixed to said forward ends of said back strap and said belly strap and oriented orthogonally thereto, said chest cinch strap having two opposing ends with releasable cinch engagement means affixed thereto, said releasable cinch engagement means operable for releasably attaching said harness to said slidable animal attachment means on said animal attachment portion of said restraining device; and (d) a rear cinch strap affixed to said rearward ends of said back strap and said belly strap and oriented in a direction substantially parallel to said chest cinch strap, said rear cinch strap having two opposing ends having engagement means affixed thereto and wherein said engagement means is operable for releasably connecting said two opposing ends of said respective cinch straps.

* * * * *